(12) United States Patent
Lee et al.

(10) Patent No.: US 9,662,868 B2
(45) Date of Patent: *May 30, 2017

(54) THERMOPLASTIC MOLDED PRODUCT COMPRISING A DECORATIVE MATERIAL

(75) Inventors: Yoo-Jin Lee, Seoul (KR); Jong-Ryang Kim, Gyeonggi-do (KR)

(73) Assignee: SK CHEMICALS CO., LTD., Seongnam-Si (KR)

( * ) Notice: Subject to any disclaimer, the term of this patent is extended or adjusted under 35 U.S.C. 154(b) by 290 days.

This patent is subject to a terminal disclaimer.

(21) Appl. No.: 13/517,084

(22) PCT Filed: Dec. 23, 2010

(86) PCT No.: PCT/KR2010/009256
§ 371 (c)(1),
(2), (4) Date: Jun. 19, 2012

(87) PCT Pub. No.: WO2011/081353
PCT Pub. Date: Jul. 7, 2011

(65) Prior Publication Data
US 2012/0282833 A1   Nov. 8, 2012

(30) Foreign Application Priority Data
Dec. 28, 2009   (KR) .................. 10-2009-0131948

(51) Int. Cl.
| B32B 27/36 | (2006.01) |
| B44C 5/04 | (2006.01) |
| B44F 1/06 | (2006.01) |
| B32B 27/06 | (2006.01) |

(52) U.S. Cl.
CPC .............. B32B 27/36 (2013.01); B32B 27/06 (2013.01); B44C 5/0453 (2013.01); B44F 1/066 (2013.01); *B32B 2307/306* (2013.01); *B32B 2307/546* (2013.01); *B32B 2307/558* (2013.01); *B32B 2451/00* (2013.01); *Y10T 428/249921* (2015.04); *Y10T 428/3179* (2015.04); *Y10T 428/31786* (2015.04); *Y10T 442/126* (2015.04)

(58) Field of Classification Search
CPC ..... B32B 27/06; B32B 27/08; B32B 2307/50; B32B 2451/00; B32B 2307/558; B32B 2307/546; B32B 2307/306; B32B 2262/0276; B32B 2262/0284; B32B 2367/00; B44C 1/10; B44C 3/04; B29C 39/00; D01F 6/84; D04H 1/435; D10B 2331/04; C08G 63/672; C08J 2367/02
USPC .................. 428/480, 481; 442/59–180, 236, 442/394–399
See application file for complete search history.

(56) References Cited

U.S. PATENT DOCUMENTS

| 4,600,643 | A | * | 7/1986 | Dwulet .................. B32B 23/08 428/364 |
| 5,643,666 | A | | 7/1997 | Eckart et al. |
| 5,958,581 | A | * | 9/1999 | Khanarian et al. .......... 428/357 |
| 5,959,066 | A | | 9/1999 | Charbonneau et al. |
| 6,025,069 | A | | 2/2000 | Eckart et al. |
| 6,063,464 | A | * | 5/2000 | Charbonneau et al. ... 428/36.92 |
| 6,126,992 | A | | 10/2000 | Khanarian et al. |
| 9,388,309 | B2 | * | 7/2016 | Kim ..................... C08G 63/672 |
| 2003/0204029 | A1 | * | 10/2003 | Brandenburg et al. ....... 525/444 |
| 2004/0101687 | A1 | | 5/2004 | Crawford et al. |
| 2007/0224433 | A1 | | 9/2007 | Saitou |

FOREIGN PATENT DOCUMENTS

| CN | 100556690 C | 11/2009 |
| JP | 2006/506485 | 2/2006 |
| JP | 2007/83494 | 4/2007 |
| KR | 2001-0034809 A | 4/2001 |

* cited by examiner

*Primary Examiner* — Jennifer A Steele
(74) *Attorney, Agent, or Firm* — Birch, Stewart, Kolasch & Birch, LLP

(57) ABSTRACT

A thermoplastic molded product including a decorative material having superior heat resistance, impact strength and flexural strength is disclosed. The thermoplastic molded product is useful for a window glass substitute, a partition, a decorative panel, a decorative film, and so on. The thermoplastic molded product comprises a copolymerized polyester resin sheet made of a copolymerized polyester resin; and at least one decorative material laminated on the copolymerized polyester resin sheet, the lamination being performed by applying heat and pressure to the copolymerized polyester resin sheet and the decorative material. The copolymerized polyester resin has an alternating structure of acid moieties which are derived from acid components and diol moieties which are derived from diol components, and the acid components comprise terephthalic acid, and the diol components comprise (i) 5~99 mol % of 1,4-cyclohexanedimethanol and (ii) 1~60 mol % of isosorbide with respect to the total diol components.

6 Claims, No Drawings

THERMOPLASTIC MOLDED PRODUCT COMPRISING A DECORATIVE MATERIAL

FIELD OF THE INVENTION

This invention relates to a thermoplastic molded product, and more particularly, to a thermoplastic molded product including a decorative material which has superior heat resistance, impact strength and flexural strength, and therefore can be used as a window glass substitute, a partition, a decorative panel, a decorative film and so on.

BACKGROUNDS OF THE INVENTION

A transparent or semi-transparent glass is commonly used as a window covering material, a partition, a decorative panel and so on. The glass can be painted or colored for a decorative effect. However, the glass has a high density, and is heavy and fragile, and it is difficult to transport and assemble the glass, and the glass is not desirable for safety. Therefore, a transparent resin such as polyvinylchloride or polycarbonate has been used as a substitute of the glass. Polyvinylchloride is not desirable environmentally because undesirable materials are generated during the molding of the polyvinylchloride. In case of the polycarbonate, a drying process is necessary before a molding process, a processing time is relatively long to increase the production cost, and a decorative material (polymer film, paper, fiber fabric, metal wire, metal mesh woven fabric, plant, mineral and so on) can be thermally decomposed in the high temperature thermal molding process, so it is difficult to mold the polycarbonate with the decorative material. Meanwhile, a polyester resin can also be used as the substitute of the glass and as a material (for example, a sheet) capable of including the decorative materials. However, the polyester resin has inferior flexural strength to be easily bent, so it is not desirable as a construction or decoration material. Further, due to the low heat resistance of the polyester resin, the use of the polyester resin is generally restricted to indoor uses.

SUMMARY OF THE INVENTION

It is an object of the present invention to provide a thermoplastic molded product including a decorative material which has superior heat resistance, impact strength and flexural strength.

To accomplish these objects, the present invention provides a thermoplastic molded product comprising a copolymerized polyester resin sheet and at least one decorative material laminated on the copolymerized polyester resin sheet, wherein the decorative material is laminated by applying heat and pressure to the copolymerized polyester resin sheet and the decorative material, and the copolymerized polyester resin sheet is formed with a copolymerized polyester resin having an alternating structure of acid moieties which are derived from acid components and diol moieties which are derived from diol components, and the acid components comprise terephthalic acid, and the diol components comprise 5~99 mol % of 1,4-cyclohexanedimethanol and 1~60 mol % of isosorbide with respect to the total diol components.

The thermoplastic molded product according to the present invention has superior heat resistance, impact strength and flexural strength because it uses the copolymerized polyester resin sheet produced with 1,4-cyclohexanedimethanol and isosorbide. The decorative material can be easily laminated on the copolymerized polyester resin sheet by applying the heat and pressure thereto. Accordingly the thermoplastic molded product of the present invention is useful as a window glass substitute, a partition, a decorative panel and so on.

DETAILED DESCRIPTION OF THE INVENTION

A more complete appreciation of the invention, and many of the attendant advantages thereof, will be better appreciated by reference to the following detailed description.

The thermoplastic molded product of the present invention includes a decorative material, and is formed with a copolymerized polyester resin sheet and at least one decorative material laminated on the copolymerized polyester resin sheet. Also, the thermoplastic molded product of the present invention can be a thermoplastic molded product having a three or more layered structure in which a copolymerized polyester resin sheet (containing 1,4-cyclohexane dimethanol and isosorbide) is further laminated for interposing the decorative material. Also, the thermoplastic molded product of the present invention can be a thermoplastic molded product having a three or more layered structure in which a polyester resin sheet copolymerized with 1,4-cyclohexane dimethanol is further laminated for interposing the decorative material between the copolymerized polyester resin sheet (containing 1,4-cyclohexane dimethanol and isosorbide) and the polyester resin sheet copolymerized with 1,4-cyclohexane dimethanol. In the polyester resin copolymerized with 1,4-cyclohexane dimethanol, the amount of 1,4-cyclohexane dimethanol is 10 to 90 mol % with respect to the total glycol components, and the remaining glycol components except 1,4-cyclohexane dimethanol can be, for example, ethylene glycol.

The copolymerized polyester resin sheet (or panel) used in the present invention can be formed with a copolymerized polyester resin by using a conventional injection molding process or extrusion molding process. The copolymerized polyester resin is prepared by a copolymerization of acid components and diol components, and has an alternating structure of acid moieties which are derived from the acid components and diol moieties which are derived from the diol components. The acid components comprise terephthalic acid, and the diol components comprise 1,4-cyclohexane dimethanol and isosorbide. The copolymerized polyester resin is generally amorphous and has a low crystallinity.

The copolymerized polyester resin sheet can be thermally molded, and can be transparent, semi-transparent or opaque. When interposing the decorative material (namely, in a three-layer-structure, the first layer and the third layer are formed with the copolymerized polyester resin sheets and the second layer is formed with the decorative material), the copolymerized polyester resin sheets may be the same or different in their physical properties, such as color, transparency, thickness and so on. When the physical property of the copolymerized polyester resin sheets is different, it is desirable for the copolymerized polyester resin sheets to have a thermal compatibility. In this case, the thermal compatibility means that the sheets are contracted or expanded with a same ratio so as to maintain their flat or even surface when the sheets are fused by applying heat. The thickness of the copolymerized polyester resin sheet can be varied according to the usage, weight, cost thereof, and is generally 0.2 to 10 mm, preferably 0.4 to 6 mm. The copolymerized polyester resin sheet may have a high relief surface, or a molded or embossed surface.

In the copolymerized polyester resin, the acid components include terephthalic acid as a major component. Specifically, all of the acid components can be terephthalic acid, or, if necessary, the acid components may partially include copolymerization acid components (copolymerization monomers) which are selected from the group consisting of aromatic dicarboxylic acid components of 8~14 carbon atoms except for terephthalic acid component, and aliphatic dicarboxylic acid components of 4~12 carbon atoms for improving the properties of the polyester resin. The preferable amount of the copolymerization acid components is 0~50 mol %, more preferably 0.1~40 mol %, and for example 1~10 mol % with respect to the total acid components. If the amount of the copolymerization acid components is beyond the range, the properties of the copolymerized polyester resin may be insufficiently improved or even deteriorated. The aromatic dicarboxylic acid components of 8~14 carbon atoms may include various aromatic dicarboxylic acid components which are conventionally used for producing polyester resin, and examples thereof include isophthalic acid, naphthalene dicarboxylic acid such as 2,6-naphthalene dicarboxylic acid, diphenyl dicarboxylic acid, and so on, and does not include terephthalic acid. The aliphatic dicarboxylic acid components of 4~12 carbon atoms include various linear, branched or cyclo aliphatic dicarboxylic acid components which are conventionally used for producing polyester resin, and examples thereof include cyclohexane dicarboxylic acid such as 1,4-cyclohexane dicarboxylic acid, 1,3-cyclohexane dicarboxylic acid, and so on, phthalic acid, sebasic acid, succinic acid, isodecylsuccinic acid, maleic acid, fumaric acid, adipic acid, glutaric acid, azelaic acid, and so on. An acid component can be used alone, or two or more acid components can be used in combination. In this specification, the term "terephthalic acid component or similar expressions" is used to include terephthalic acid, alkyl ester thereof (lower alkyl ester of 1~4 carbon atoms such as monomethyl, monoethyl, dimethyl, diethyl, dibutyl ester and so on), and/or acid anhydride thereof, which can produce terephthaloyl moiety when react with glycol components. Also, in this specification, the acid moiety or the diol moiety represents a residue which remains after hydrogens, hydroxyl groups, or alkoxy groups are removed from the acid components or the diol components in a conventional polyester polymerization reaction.

The diol components include (i) 5~99 mol %, preferably 5~95 mol %, more preferably 8~91 mol % of 1,4-cyclohexane dimethanol and (ii) 1~60 mol %, preferably mol % range of the following Equation 1 and equal or less than 60 mol %, more preferably 4~40 mol % of isosorbide with respect to the total diol components. In the following Equation 1, ISB mol % represents the amount of isosorbide, and CHDM mol % represents the amount of 1,4-cyclohexane dimethanol.

$$0.0012(CHDM\ mol\ \%)^2 - 0.2401(CHDM\ mol\ \%) + 14.136 \leq ISB\ mol\ \% \leq 0.0049(CHDM\ mol\ \%)^2 - 0.2255(CHDM\ mol\ \%) + 71.176 \qquad [\text{Equation 1}]$$

The remaining components of the diol components can be (iii) ethylene glycol, and (iv) other copolymerization diol components (monomers) for improving the properties of polyester resin. Aforementioned other copolymerization diol components can be one or more glycols selected from the group consisting of diethylene glycol, triethylene glycol, propanediol (for example, 1,2-propanediol and 1,3-propanediol), 1,4-butanediol, pentanediol, hexanediol (for example, 1,6-hexanediol), neopentyl glycol (2,2-dimethyl-1,3-propanediol), 1,2-cyclohexanediol, 1,4-cyclohexanediol, 1,2-cyclohexane dimethanol, 1,3-cyclohexane dimethanol, tetramethyl cyclobutanediol, and mixtures thereof. In the diol components, when diol components other than (i) 1,4-cyclohexane dimethanol and (ii) isosorbide are used, the major component of the other diol components is preferably (iii) ethylene glycol. Except ethylene glycol, when (iv) other copolymerization diol components for improving the properties of the polyester resin are used, the amount of (iv) other copolymerization diol components is preferably 0~50 mol %, more preferably 0.1~40 mol %, and for example 1~10 mol % with respect to the total diol components. In the polyester of the present invention, the amounts of 1,4-cyclohexane dimethanol and isosorbide (1,4:3,6-dianhydroglucitol) are controlled to the above-mentioned ranges, and, in the above-mentioned ranges, it is found that the impact strength of the polyester resin rapidly increases as the amount of 1,4-cyclohexane dimethanol increases. Therefore, in the present invention, 1,4-cyclohexane dimethanol and isosorbide improve the properties (processability and so on) of the produced polyester resin compared with a homopolymer prepared with terephthalic acid and ethylene glycol. When the amount of 1,4-cyclohexane dimethanol is less than 5 mol %, the impact strength of the polyester resin may be insufficient. When the amount of 1,4-cyclohexane dimethanol is more than 99 mol %, the amount of isosorbide is less than 1 mol % and the heat-resistance of the polyester resin may decrease. Meanwhile, when the amount of isosorbide is less than 1 mol %, the heat-resistance of the polyester resin may be insufficient, and when the amount of isosorbide is more than 60 mol %, the color of the polyester resin may become yellow.

When the copolymerized polyester resin of the present invention is molded into a test sample of thickness of 3.2 mm, the notch izod impact strength (ASTM D256 method, measuring temperature: 23° C.) of the test sample is preferably equal or more than 50 J/m. On the other hand, when a copolymerized polyester resin is prepared with ethylene glycol and isosorbide, the test sample generally has the notch izod impact strength of less than 50 J/m. When the copolymerized polyester resin of the present invention is subject to an annealing treatment at 300° C. for 5 minutes, and is cooled to room temperature, and then is re-heated and scanned ($2^{nd}$ scan) with the temperature increasing speed of 10° C./min, the polyester resin preferably shows the glass transition temperature (Tg) of equal or more than 90° C. Meanwhile, when the copolymerized polyester resin is dissolved with orthochlorophenol (OCP) to a concentration of 1.2 g/dl, the polyester resin shows the intrinsic viscosity of equal or more than 0.35 dl/g, preferably equal or more than 0.40 dl/g, more preferably equal or more than 0.45 dl/g at the temperature of 35° C. The copolymerized polyester resin has superior heat-resistance and impact strength, and therefore, the polyester resin is suitable for producing products or articles such as a film, a sheet, a drink bottle, a baby bottle, a fiber, an optical product, and so on.

Hereinafter, a method for preparing the copolymerized polyester resin of the present invention will be described. The copolymerized polyester resin can be prepared by a conventional method for preparing a copolymerized polyester resin.

For example, (a) the acid components and the diol components are subject to an esterification reaction or a trans-esterification reaction at the increased pressure of 0.2~3.0 kg/cm² and at the temperature of 200~300° C. during an average retention time of 2~10 hours. The acid components may include (i) 80~100 mol % of terephthalic acid component and (ii) 0~20 mol % of dicarboxylic acid components which are selected from the group consisting of aromatic dicarboxylic acid components of 8~14 carbon atoms and aliphatic dicarboxylic acid components of 4~12 carbon atoms. The diol components may include (i) 5~99 mol % of 1,4-cyclohexane dimethanol, (ii) 1~60 mol % of isosorbide, and optionally (iii) ethylene glycol by which the total amount of the diol components becomes 100 mol %. Next, (b) the product of the esterification reaction or the trans-esterification reaction is subject to a polycondensation reaction at the reduced pressure of 400~0.1 mm Hg and at the temperature of 240~300° C. during an average retention time of 1~10 hours to produce the polyester resin. Preferably, the pressure of the polycondensation reaction eventually reaches to less than 2.0 mmHg, and the esterification reaction or the trans-esterification reaction and the polycondensation reaction are carried out under an inert gas atmosphere.

The decorative material used in the present invention is used for imparting a decorative effect to the thermoplastic molded product, and example thereof includes a polymer film, a paper, a fiber fabric, a metal wire, a metal mesh woven fabric, a plant, a mineral and so on. When polymer film and paper and so on are used as the decorative material, various decoration images may be printed on either or both side thereof, and the images can be seen or viewed through the upper and/or the lower copolymerized polyester resin sheet. When the metal wire and the metal mesh woven fabric are used as the decorative material, the materials may reinforce the thermoplastic molded product as well as may impart the decoration effect.

In the thermoplastic molded product containing the decorative material, a 1,4-cyclohexane dimethanol copolymerized polyester resin sheet (wherein, the amount of 1,4-cyclohexane dimethanol is 10 to 90 mol %, for example 20 to 80 mol % with respect to the total glycol components, and the other glycol components except 1,4-cyclohexane dimethanol is, for example, ethylene glycol) may replace the copolymerized polyester resin sheet (third layer resin sheet). In this case, it is preferable that the 1,4-cyclohexane dimethanol copolymerized polyester resin sheet has a thermal compatibility with the copolymerized polyester resin sheet forming the first layer. The thickness of the 1,4-cyclohexane dimethanol copolymerized polyester resin sheet may be varied according to its usage, weight and cost, and for example is 0.2 to 10 mm, preferably 0.4 to 6 mm. In addition, the 1,4-cyclohexane dimethanol copolymerized polyester resin sheet may have a high relief surface, or a molded or embossed surface.

Between the copolymerized polyester resin sheet (the first layer) and the decorative material (the second layer) and/or between the decorative material (the second layer) and the copolymerized polyester resin sheet or the 1,4-cyclohexane dimethanol copolymerized polyester resin sheet (the third layer), an auxiliary layer can be formed as a laminating enhancer layer for preventing the formation of air pocket or for preventing uneven adhesion. As the auxiliary layer, conventional polymer sheet such as polyvinylchloride, polyester and so on can be used, and the auxiliary layer preferably has the thermal compatibility with the copolymerized polyester resin sheet.

In the thermoplastic molded product of the present invention, the lamination of the copolymerized polyester resin sheet, one or more decorative materials, the 1,4-cyclohexane dimethanol copolymerized polyester resin sheet, and so on, can be carried out by stacking the copolymerized polyester resin sheet, the decorative materials, the 1,4-cyclohexane dimethanol copolymerized polyester resin sheet, and so on in 2 layered or 3 layered structures and then applying heat and pressure thereto. Generally, the laminate (the thermoplastic molded product of the present invention) is produced by applying heat of 90 to 900° C. and the pressured of 0.6 to 3.5 Mpa, which can be varied according to the kind of the decorative material, and so on.

In the thermoplastic molded product of the present invention, a coating composition can be coated or other resin sheet can be further laminated on the thermoplastic molded product for improving the strength and the abrasive resistance of the thermoplastic molded product. The coating composition may contain polyurethane, silicone and so on. The resin sheet can be made of polyvinylchloride, polyethylene terephthalate, polymethyl methacrylate, polycarbonate and so on.

In the thermoplastic molded product of the present invention, a heat stabilizer can be further added during a polymerization reaction of the copolymerized polyester resin or during an injection molding process or an extrusion molding process. The heat stabilizer is added for preventing the discoloration of the product due to heat during the molding process or during use of the molded product. As the heat stabilizer, conventional heat stabilizers, for example, phenolic heat stabilizer, monophenolic heat stabilizer, bisphenolic heat stabilizer, polymer type phenolic heat stabilizer, amine based heat stabilizer, thiol based heat stabilizer, phosphorous based heat stabilizer, and so on, can be used. The amount of the heat stabilizer can be varied according to the kind of the heat stabilizer.

Further, in the thermoplastic molded product of the present invention, a branching agent can be further added during a polymerization reaction of the copolymerized polyester resin or during an injection molding process or an extrusion molding process. The branching agent is added for improving a flexural strength of the product. As the branching agent, a conventional branching agent having 3 functional groups, for example, trimellitic acid, trimellitic anhydride, trimethylol propane and so on, can be used. The amount of the branching agent can be varied according to the kind of the branching agent.

Hereinafter, examples and comparative examples are provided to illustrate the present invention in more detail, but the present invention is not restricted or limited by the following examples.

In the following examples and comparative Examples, TPA represents terephthalic acid, IPA represents isophthalic acid, ISB represents isosorbide (1,4:3,6-dianhydroglucitol), CHDM represents 1,4-cyclohexanedimethanol, and EG represents ethylene glycol. Polymer's properties are evaluated as follows.

(1) Intrinsic viscosity (IV): IV of a polymer is measured with a Ubbelohde viscometer in a thermostat of 35° C., after dissolving the polymer in orthochlorophenol at 150° C. to the concentration of 0.12%.

(2) Heat-resistance (Glass-rubber transition temperature: Tg): A polyester resin is annealed at 300° C. for 5 minutes, cooled to room temperature, and again heated with the temperature increasing speed of 10° C./min ($2^{nd}$ scan). Tg of the polyester resin is measured during the $2^{nd}$ scan.

(3) Impact strength: A test sample of a thickness of 3.2 mm is prepared with a polyester resin. The test sample is notched, and Izod impact strength of the polyester resin is measured at 23° C. according to ASTM D256.

(4) Flexural strength: A test sample of a thickness of 3.2 mm is prepared with a polyester resin. Flexural strength of the polyester resin is measured with a flexural strength tester according to ASTM D256.

(5) Processability (Moldability): A sheet of a thickness of 3 mm is prepared with a polyester resin by using an extruder. The sheet is kept at 50% of relative humidity and at 60° C. for 2 weeks, and then thermoformed by using Famale mold (heating power: 50/25%) having a draw ratio of 2.5:1. After the thermoforming, blisters formed on the sheet is counted with naked eyes and the polyester resin is classified into "Available state(○; Number of blisters is equal or less than 2.)" or "Non-available state(X; Number of blisters is equal or more than 3.)".

[Comparative Example 1] Preparation of Copolymerized Polyester Resin

TPA, ISB and EG were introduced into a reactor of 7 L volume with the amounts shown in Table 1, and the reactor was heated to 240~300° C. A catalyst, a stabilizer, a colorant and so on were added to the reactor, and an esterification reaction and a polycondensation reaction were carried out. The polymerization reaction was carried out until a viscosity of produced polyester reached to a predetermined value. As shown in Table 1, in the final copolymerized polyester resin, the acid component was TPA only, and the glycol components were 4 mol % of ISB, 0 mol % of CHDM, 94 mol % of EG and 2 mol % DEG, the intrinsic viscosity (polymerization degree) was 0.74 dl/g, the heat-resistance (Tg) was 85° C., the Izod impact strength according to ASTM D256 was 38 J/m, and the flexural strength was 81 MPa.

[Comparative Examples 2-5] Preparation of Copolymerized Polyester Resin

Except for using TPA, IPA, ISB, CHDM and EG with the amounts shown in Table 1, a copolymerized polyester resin was prepared by the same manner described in Comparative Example 1. Intrinsic viscosity, heat-resistance (Tg) and Izod impact strength, flexural strength and moldability of the produced polyester resin were measured with the above described methods, and represented in Table 1.

[Examples 1-7] Preparation of Copolymerized Polyester Resin

Except for using TPA, IPA, ISB, CHDM and EG with the amounts shown in Table 1, a copolymerized polyester resin was prepared by the same manner described in Comparative Example 1. Intrinsic viscosity, heat-resistance (Tg) and Izod impact strength, flexural strength and moldability of the produced polyester resin were measured with the above described methods, and represented in Table 1.

TABLE 1

| | Examples | | | | | | | Comparative Examples | | | | |
|---|---|---|---|---|---|---|---|---|---|---|---|---|
| | 1 | 2 | 3 | 4 | 5 | 6 | 7 | 1 | 2 | 3 | 4 | 5 |
| TPA (%) | 100 | 100 | 100 | 90 | 100 | 100 | 100 | 100 | 100 | 100 | 90 | 100 |
| IPA (%) | | | | 10 | | | | | | | 10 | |
| ISB (%) | 4 | 9 | 38 | 19 | 20 | 40 | 18 | 4 | 10 | 39 | 20 | 0 |
| CHDM (%) | 8 | 91 | 22 | 42 | 58 | 55 | 21 | 0 | 0 | 0 | 0 | 60 |
| EG (%) | 88 | 0 | 40 | 39 | 22 | 5 | 61 | 96 | 90 | 61 | 80 | 40 |
| IV (dl/g) | 0.75 | 0.66 | 0.59 | 0.63 | 0.69 | 0.55 | 0.70 | 0.74 | 0.65 | 0.58 | 0.63 | 0.75 |
| Heat-resistance (Tg, ° C.) | 85 | 92 | 123 | 104 | 107 | 130 | 102 | 85 | 93 | 124 | 104 | 85 |
| Impact strength (J/m) | 55 | 90 | 68 | 129 | N.B | 302 | 91 | 38 | 37 | 30 | 32 | N.B |
| Flexural strength (MPa) | 80 | 75 | 92 | 82 | 85 | 90 | 84 | 81 | 71 | 88 | 80 | 67 |
| Moldability (○, X) | ○ | ○ | ○ | ○ | ○ | ○ | ○ | X | X | X | X | X | impact strength, flexural strength and moldability of the produced polyester resin were measured with the above described methods, and represented in Table 1.

In Example 5 and Comparative Example 5, the impact strength could not be measured because the polyester was not broken (No-Break: N.B) due to high mechanical strength. As shown in Table 1, compared with the prior polyester resins, the copolymerized polyester resins of the present invention has same or higher flexural strength, but has much superior impact strength. Accordingly, the product of the present invention is useful for various applications such as the outdoor product, which was not possible because of the inferior heat resistance. The product of the present invention has superior impact strength, and thus the product is not easily broken when processing and using the product. In addition, the flexural strength of the product of the present invention is improved, and thus the molded product (such as a sheet) is less easily bent, and the molded product can be prepared in a large size, and the life time thereof also increases.

In the moldability of the copolymerized polyester resin sheet, blisters were not produced in the thermal molding process of the copolymerized polyester resin sheets of Examples 1 to 7. To the contrary, blisters were produced in the thermal molding process of the copolymerized polyester resin sheets of Comparative Examples 1 to 5. Thus, the resin sheets of Comparative Examples 1 to 5 are not suitable as the thermoplastic molded product containing decorative materials which requires a thermal molding process to form the product.

The invention claimed is:
1. A thermoplastic decorative panel comprising:
a copolymerized polyester resin sheet; and
at least one decorative material laminated on the copolymerized polyester resin sheet,
wherein the decorative material is laminated by applying heat and pressure to the copolymerized polyester resin sheet and the decorative material, and
the copolymerized polyester resin sheet is formed with a copolymerized polyester resin having an alternating structure of acid moieties which are derived from acid components and diol moieties which are derived from diol components, and the acid components comprise terephthalic acid, and the diol components comprise 55 to 91 mol % of 1,4-cyclohexanedimethanol and 4 to 40 mol % of isosorbide with respect to the total diol components, wherein the amount of acid is 50 mol % of the total copolymerized polyester resin sheet, wherein a glass transition temperature (Tg) of the copolymerized polyester resin is equal or more than 90° C., izod impact strength thereof is equal or more than 90 J/m, and intrinsic viscosity of the copolymerized polyester resin is equal or more than 0.35 dl/g, and the intrinsic viscosity is measured at the temperature of 35° C. while the copolymerized polyester resin is dissolved with orthochlorophenol to a concentration of 1.2 g/dl, and wherein a thickness of the copolymerized polyester resin sheet is 0.2 to 10 mm.

2. The thermoplastic decorative panel of claim 1, further comprising a copolymerized polyester resin sheet containing 1,4-cyclohexanedimethanol and isosorbide or a polyester resin sheet copolymerized with 1,4-cyclohexanedimethanol which is laminated on the decorative material, for interposing the decorative material.

3. The thermoplastic decorative panel of claim 1, wherein the acid components comprise (i) the terephthalic acid, and further comprise (ii) one or more copolymerization acid components which are selected from the group consisting of aromatic dicarboxylic acid components of 8~14 carbon atoms, and aliphatic dicarboxylic acid components of 4~12 carbon atoms, in the amount of 0~50 mol % with respect to the total acid components.

4. The thermoplastic decorative panel of claim 1, wherein the amount of isosorbide (ISB mol %) and the amount of 1,4-cyclohexane dimethanol (CHDM mol %) with respect to the total diol components are in the range of the following Equation 1, $$0.0012(\text{CHDM mol \%})^2 - 0.2401(\text{CHDM mol \%}) + 14.136 \leq \text{ISB mol \%} \leq 0.0049(\text{CHDM mol \%})^2 - 0.2255(\text{CHDM mol \%}) + 71.176. \quad [\text{Equation 1}].$$

5. The thermoplastic decorative panel of claim 1, wherein the upper and the lower copolymerized polyester resin sheets are prepared by an injection molding or an extrusion molding of the copolymerized polyester resin.

6. The thermoplastic decorative panel of claim 1, wherein the decorative material is selected from the group consisting of a polymer film, a paper, a fiber fabric, a metal wire, and a metal mesh woven fabric.

* * * * *